it) United States Patent
Todani et al.

(10) Patent No.: US 7,515,355 B2
(45) Date of Patent: Apr. 7, 2009

(54) COMPACT ZOOM LENS (75) Inventors: Satoshi Todani, Saitama (JP); Masashi Shinya, Saitama (JP)

(73) Assignee: Tamron Co., Ltd., Saitama-Ken (JP)

( * ) Notice: Subject to any disclaimer, the term of this patent is extended or adjusted under 35 U.S.C. 154(b) by 79 days.

(21) Appl. No.: 11/641,061

(22) Filed: Dec. 19, 2006

(65) Prior Publication Data

US 2007/0171546 A1 Jul. 26, 2007

(30) Foreign Application Priority Data

Jan. 16, 2006 (JP) ............................. 2006-007814

(51) Int. Cl.
*G02B 15/14* (2006.01)
(52) U.S. Cl. ...................... 359/701; 359/704
(58) Field of Classification Search ................ 359/425, 359/704, 699–701
See application file for complete search history.

(56) References Cited

U.S. PATENT DOCUMENTS 5,978,156 A 11/1999 Okada 6,754,011 B2* 6/2004 Todani ..................... 359/699
2003/0179467 A1 9/2003 Satoshi
2005/0185289 A1 8/2005 Omiya

FOREIGN PATENT DOCUMENTS

| JP | 08-304684 | 11/1996 |
| JP | 2000-089086 | 3/2000 |
| JP | 2003-279835 | 10/2003 |

* cited by examiner

*Primary Examiner*—Joseph Martinez
(74) *Attorney, Agent, or Firm*—Jacobson Holman PLLC

(57) ABSTRACT

The present invention is directed to a compact zoom lens that attains a reduction in outermost diameter of the lens barrel and weight and that greatly enhances a forward stroke of a first group of lenses. The compact zoom lens has a telescopic structure of a grouped-lens sliding frame, a first cam barrel, and a linearly movable barrel underlaying a fixed barrel one over another in this order, with a second cam barrel overlaying the same. Both the lens-group sliding frame and the first cam barrel are fixed in rotational direction and are engaged with each other so as to enable a relative rotation with each other along the optical axis, and the rotation of the first cam barrel is transmitted to the second cam barrel by means of the lens-group sliding frame.

2 Claims, 10 Drawing Sheets

COMPACT ZOOM LENS

FIELD OF THE INVENTION

The present invention relates to an inner-focusing compact zoom lens, and more particularly, to a compact zoom lens that is downsized, and reduced in weight and the number of component barrel members.

BACKGROUND OF THE INVENTION

In an inner-focusing compact zoom lens, a varied ratio of a displacement of a focusing lens is greater in a close-up range, and in order to enhance a close-up performance with a single focusing cam scheme, a shift of the focal point becomes variably greater in the remaining zoom ranges where the lens behaves like a so-called vari-focal lens. A focusing cam curve useful to convert a vari-focal property to accommodate the zoom ranges must be prepared with appropriate adjustment of zooming parameters in relation with focusing parameters. Concentrating on the smooth zooming and focusing, it is hard to ensure a well-balanced cam configuration, and a revolving angle of the focusing cam must be varied, or some other corrections of the focusing cam are required.

In the prior art compact high-ratio zoom lens, the focusing lens is displaced while being revolved during both the zooming and the focusing. Guide grooves for rotational manipulations of a focusing cam barrel are engraved to support a cam mechanism; and the zooming causes operation pins fitting in the guide grooves to slide along the same so as to manipulatively rotate the focusing cam barrel. Thus, during the zooming, the focusing lens can move by an appropriate displacement in the zoom range which is determined by a rotational deviation of an operative range given by the focusing cam mechanism (see Patent Document 1 listed below).

Another prior art compact zoom lens can attain a focusing displacement by virtue of a concentric arrangement of a focus correcting cam with a focusing cam (see Patent Document 2).

Still another prior art compact high-ratio zoom lens assumes a five-layer telescopic structure where first cam, second cam, linearly movable and third cam barrel members overlay a fixed barrel (see Patent Document 2).

Further another prior art compact high-ratio zoom lens is comprised of a first cam barrel member underlaying a fixed barrel, a linearly movable barrel member underlaying the first cam barrel member, a focusing cam barrel member underlaying the linearly movable barrel member, and a second cam barrel member overlaying the fixed barrel and rotatably connected with the first cam barrel member where 2nd-lens-group studs disposed in an inner surface of the focusing cam barrel member are "fitted in focusing cams of the focusing cam barrel member, second group focusing cams 81 attached to a 2nd-lens-group slidable frame 72 for a linearly movable barrel member 18, 2nd-lens-group guide cams for the linearly movable barrel member 18, and first longitudinal guide grooves 82 in a first cam barrel member of a first cam barrel 16" (see Patent Document 3).

LIST OF THE CITED PATENT DOCUMENTS

Patent Document 1
Japanese Preliminary Patent Publication No. H8-304684;
Patent Document 2 and
Japanese Preliminary Patent Publication No. 2000-89086;
Patent Document 3
Japanese Preliminary Patent Publication No. 2003-279835;

In the compact high-ratio zoom lens disclosed in Patent Document 1, it is hard to ensure a sufficient displacement of the lens for the focusing while still enhancing the close-up performance and suppressing a variation in the focal point within any zoom range. Also, in the zoom lens in Document 1, there is a disadvantage that its outer diameter cannot be reduced any longer because of the five-layer telescopic structure where the first cam barrel member underlays the fixed barrel member while the second cam, linearly movable and third cam barrel members overlay the fixed barrel member.

The compact high-ratio zoom lens disclosed in Patent Document 2 has a mechanism which moves a focusing lens linearly during the zooming, and therefore, there is a problem that a constant amount of correction is made in any zoom region, which means an amount of the correction required to shorten a close-up shooting range is insufficient in every zoom range of the high-ratio zoom lens.

The compact high-ratio zoom lens disclosed in Patent Document 3 cited above also assumes a five-layer telescopic structure where the first cam, second cam, linearly movable, and third cam barrel members overlay the fixed barrel, and hence, its outer diameter can no longer be reduced.

In the compact high-ratio zoom lens disclosed in Patent Document 4, since the 2nd-lens-group sliding frame is disposed inside the innermost focusing cam barrel, a spread of the second and third groups of lenses becomes tighter along the optical axis relative to displacements of the remaining groups of lenses during the zooming, especially upon zooming for the tele-photo shooting, and this brings about a problem that the 2nd-lens-group sliding frame cannot intervene in the tightly clustered second and third groups of lenses. The zoom lens set forth in Document 4 also has a zoom cooperative ring between the fixed barrel and the first cam barrel member, and this leads to a problem that outer dimensions of the lens barrel cannot be reduced any longer. The zoom lens in this cited document additionally meets a disadvantage that varying intervals between sliding elements and other barrel members cause slidable frames to move with a clatter and vibrate in the directions orthogonal to the optical axis of the lens, and this leads to a problem of a shake in the image.

The present invention is made to overcome the above-mentioned problems of the prior art inner focusing compact zoom lens, and accordingly, it is an object of the present invention to provide a compact zoom lens that attains a reduction in outermost diameter of a lens barrel and weight by reducing barrel members or component layers in number from the prior art five-layer telescopic structure of an innermost fixed barrel, a first cam barrel, a second cam barrel, a linearly movable barrel, and a third cam barrel laid one over another to a four-layer telescopic structure of an innermost linearly movable barrel, a first cam barrel, a fixed barrel, and a second cam barrel.

It is another object of the present invention to provide a compact zoom lens that successfully downsizes its most retracted posture while the camera is not in use and greatly enhances a forward stroke of a first or front-end group of lenses.

It is further another object of the present invention to provide a compact zoom lens where sliding elements and other barrel members are spaced to ensure a smooth movement of slidable frames without a clatter and a vibration in the directions orthogonal to the optical axis of the lens, thereby causing a reduced shake or almost no shake in the image.

It is yet another object of the present invention to provide a compact zoom lens capable of shortening a close-up shooting range.

It is still another object of the present invention to provide a compact zoom lens where second and third groups of lenses are moved along the optical axis during the zooming especially for the tele-photo shooting till the groups of lenses come in contact with each other, thereby facilitating to raise a zoom ratio.

SUMMARY OF THE INVENTION

In a first aspect of the invention, a compact zoom lens has a grouped-lens sliding frame (72), a first cam barrel (16), and a linearly movable barrel (18) underlaying a fixed barrel (12) one over another in this order, and a second cam barrel (22) overlaying the fixed barrel (12). The grouped-lens sliding frame (72) and the first cam barrel (16) revolve in fixed directions, respectively, and engage with each other to move relative to each other along the optical axis. A revolving motion of the first cam barrel (16) is transmitted to the second cam barrel (22) through the grouped-lens sliding frame (72).

In a second aspect of the invention, a compact zoom lens comprised of four groups (first to fourth groups) of lenses has a 2nd-lens-group sliding frame (72) carrying the second group of lenses, a first cam barrel (16), and a linearly movable barrel (18) underlaying a fixed barrel (12) one over another in this order, and a second cam barrel (22) overlaying the fixed barrel (12).

The fixed barrel (12) is formed with third longitudinal guide grooves (52) that 3rd-lens-group guide studs (43) implanted in and extended outwardly from a 3rd-lens-group holding frame (3) are fitted in.

The first cam barrel (16) is provided with 3rd-lens-group and 4th-lens-group guide cams (44) and (46) in which 3rd-lens-group and 4th-lens-group guide studs (43) and (45) are respectively fitted in. The first cam barrel (16) has its end closer to an object formed with recesses (100) extending along the optical axis.

The 2nd-lens-group sliding frame (72) has studs (50) implanted therein and protruding outward therefrom to cooperatively work with the second cam barrel, and it also ahs studs (74) implanted therein and protruding inward therefrom.

The linearly movable barrel (18) is formed with apertures (56), second longitudinal guide grooves (60) and 2nd-lens-group guide cams (80); and the 3rd-lens-group guide studs (43) are fitted in the apertures (56), the 4th-lens-group guide studs (45) are fitted in the guide grooves (60), and the 2nd-lens-group studs (74) extend through the guide cams (80). Guide studs (66) protrude outward ahead of the fixed barrel (12) to guide the 1st-lens-group sliding frame.

The second cam barrel (22) has its outer surface provided with 1st-lens-group guide cams (77) and its inner surface formed with fifth longitudinal guide grooves (48); and 1st-lens-group sliding studs (70) implanted in the 1st-lens-group sliding frame (24) are fitted in the guide cams (77) while studs (50) implanted in the 2nd-lens-group sliding frame (72) are fitted in the guide grooves (48) to cooperatively work with the second cam barrel.

In accordance with the present invention, the compact zoom lens attains a reduction in outermost diameter of the lens barrel and then in weight by reducing barrel members or component layers in number from the prior art five-layer telescopic structure of an innermost fixed barrel, a first cam barrel, a second cam barrel, a linearly movable barrel, and a third cam barrel laid one over another to a four-layer telescopic structure of the innermost linearly movable barrel, the first cam barrel, the fixed barrel, and the second cam barrel.

The compact zoom lens according to the present invention also successfully downsizes its most retracted posture while the camera is not in use and greatly enhances a forward stroke of a first or front-end group of lenses.

In the compact zoom lens according to the present invention, the sliding elements and other barrel members are spaced to ensure a smooth movement of the slidable frames without a clatter and a vibration in the directions orthogonal to the optical axis of the lens, thereby causing a reduced shake or almost no shake in the image.

The compact zoom lens of the present invention is capable of shortening a close-up shooting range.

Moreover, in the compact zoom lens according to the present invention, the second and third groups of lenses are moved along the optical axis during the zooming for the tele-photo shooting till these groups of lenses come in contact with each other, thereby facilitating to raise a zoom ratio.

BEST MODE OF THE INVENTION

The best mode of a preferred embodiment of a compact zoom lens 1 according to the present invention will be detailed in conjunction with the accompanying drawings.

<Optics>

Figure 1:
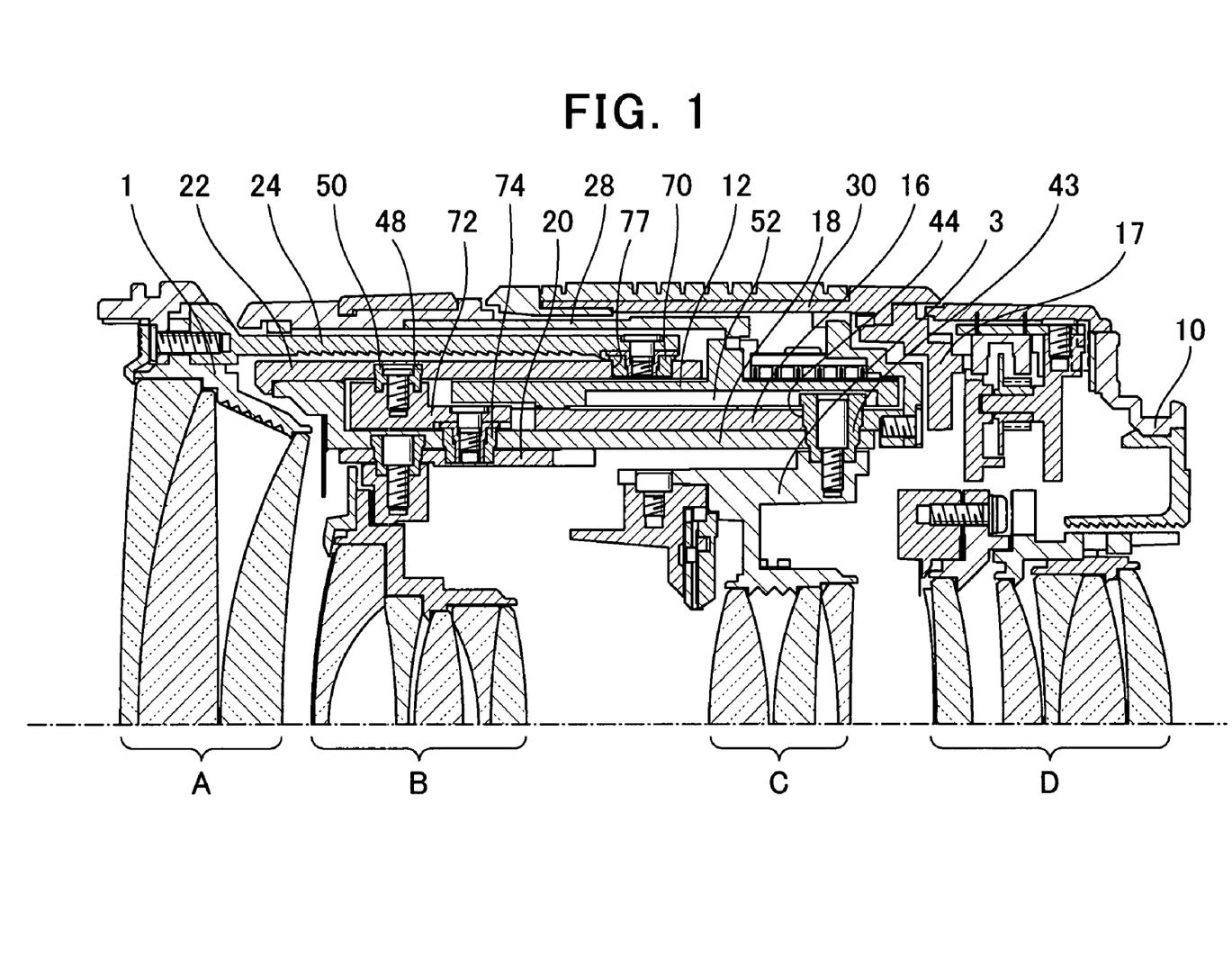
FIG. 1 is a sectional view illustrating a preferred embodiment of a compact zoom lens according to the present invention in a zoom-wide posture.
Figure 2:
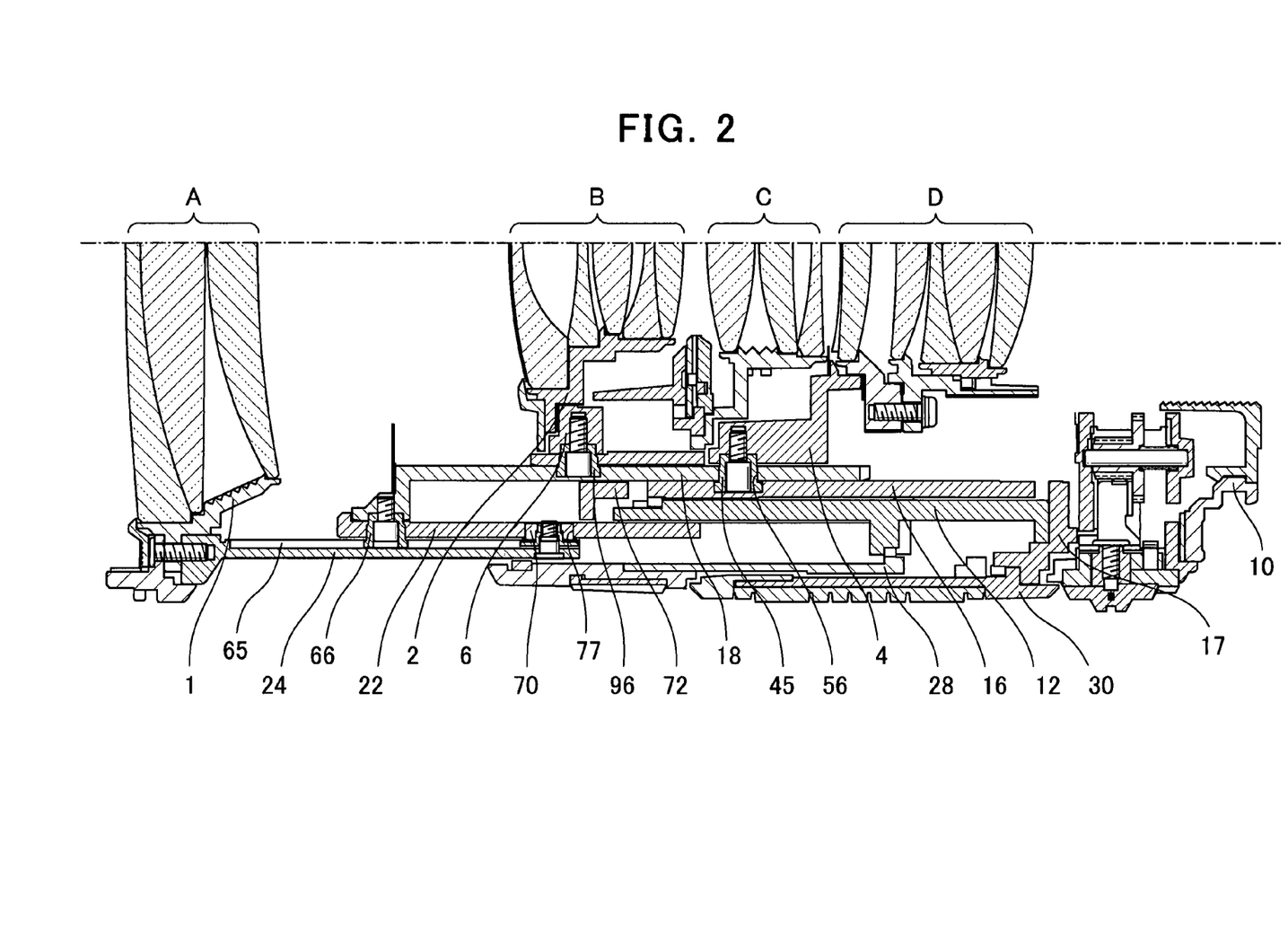
FIG. 2 is a sectional view illustrating the exemplary compact zoom lens in a zoom-tele posture.

Optics of the compact zoom lens is, as depicted in FIGS. 1 and 2, composed of four groups of lenses, namely, first to fourth groups of lenses, which produce an image of APS-C size (23.2 mm×15.5 mm) and are 17 to 50 mm in focal length and 2.8 in F number. As to each lens group, namely, the first group A of lenses held together by a 1st-lens-group holding frame 1, the second group B of lenses held by a 2nd-lens-group holding frame 2, the third group C of lenses held by a 3rd-lens-group holding frame 3, and the fourth group D of lenses held by a 4th-lens-group holding frame 4, their respective axial focal lengths are +86.0 mm, −12.5 mm, +43.0 mm, and +37.5 mm in the alphabetical order.

<Basic Structure>

The compact zoom lens 1 is basically structured, as in FIGS. 1 and 2, having a fixed barrel 12, a first cam barrel 16, a linearly movable barrel 18, and a focusing cam barrel 20 where the fixed barrel 12 is fixed to a lens mount 10 attached to a camera body (not shown), the first cam barrel 16 is disposed inside the fixed barrel 12, the linearly movable barrel 18 is disposed inside the first cam barrel 16, and the focusing cam barrel 20 is positioned inside the linearly movable barrel 18. Ahead of the first cam barrel 16, or at a position closer to an object, a 2nd-lens-group sliding frame 72 is located.

The compact zoom lens 1 structured basically in this manner further includes a second cam barrel 22 outside the fixed barrel 12, and a 1st-lens-group sliding frame 24 residing outside the cam barrel 22. Outside the 1st-lens-group sliding frame 24, located are a zoom ring 30 used for the zooming and a focusing ring 28 used for the focusing. The zoom ring 30 is linked to the first cam barrel 16 by means of a zoom connector member 17. The focusing ring 28 is linked to the focusing cam barrel 20 by means of the focusing connector studs 40.

<Components>

Figure 3:
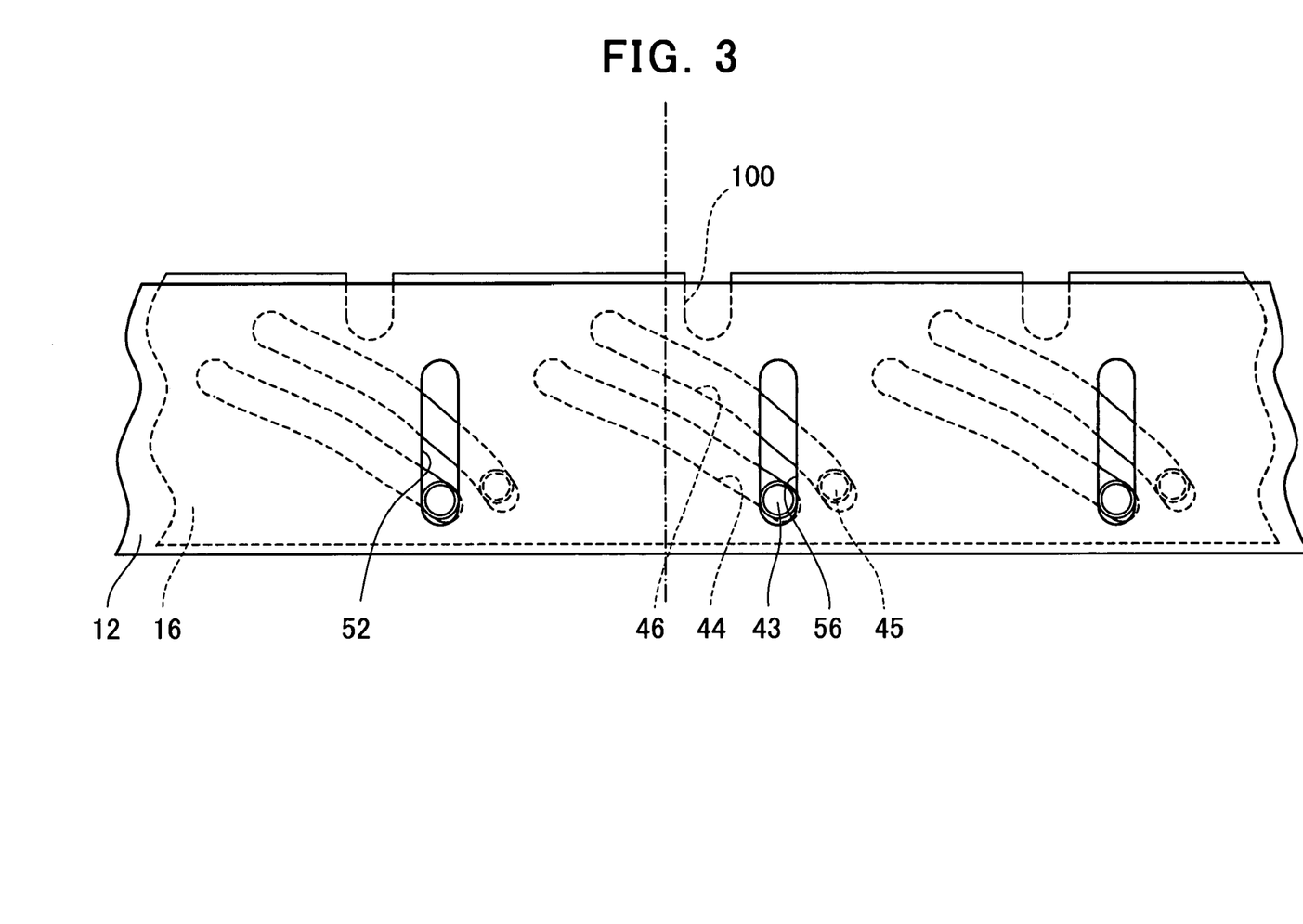
FIG. 3 is an exploded view illustrating a fixed barrel of the exemplary compact zoom.

Inside the fixed barrel 12, as shown in FIG. 3, provided are third longitudinal guide grooves 52 in which 3rd-lens-group guide studs 43 implanted in the linearly movable barrel 18 are fitted.

Figure 4:
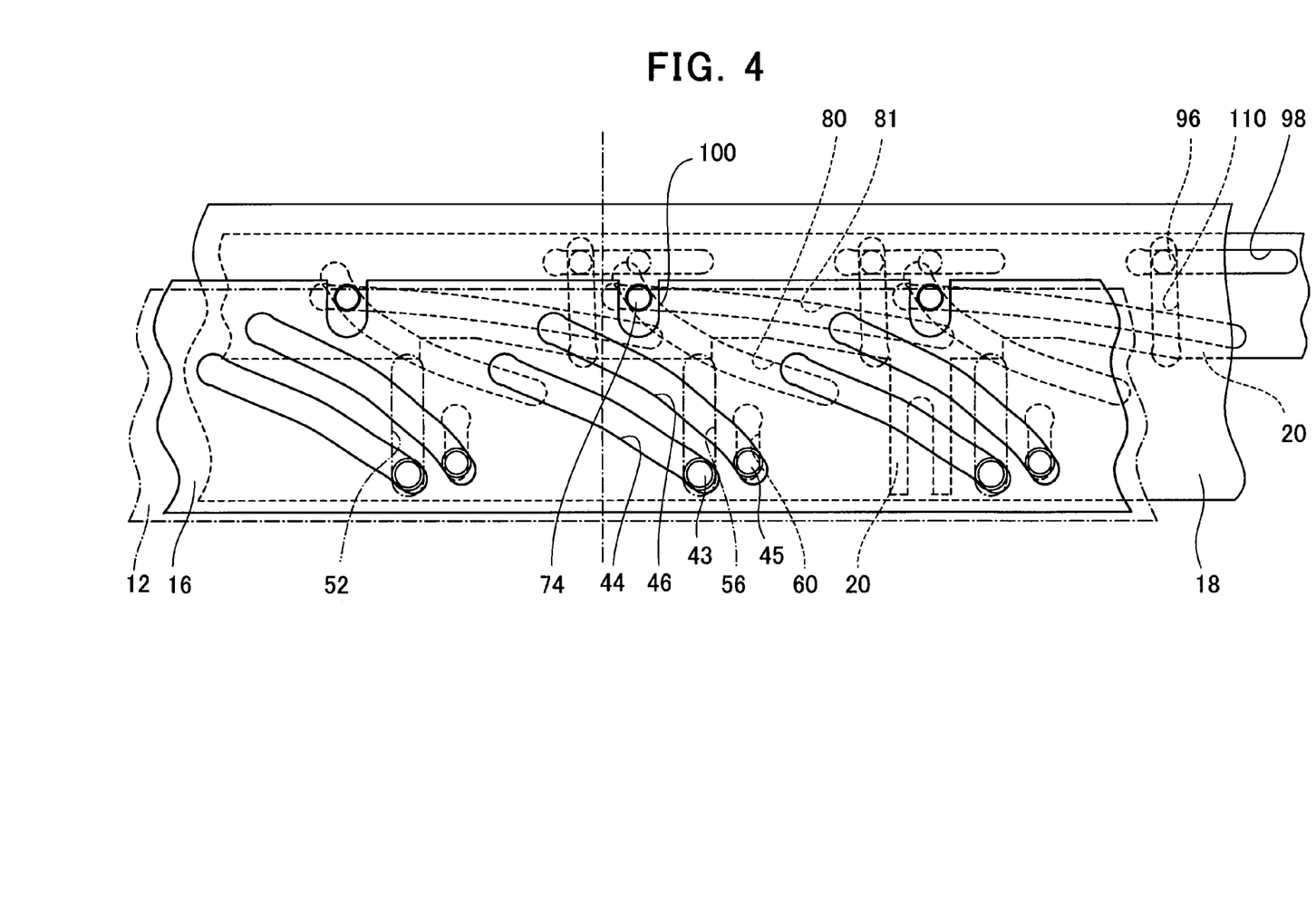
FIG. 4 is an exploded view illustrating a first cam barrel of the exemplary compact zoom.

The 3rd-lens-group guide studs 43 are, as shown in FIGS. 1 and 2, implanted in the 3rd-lens-group holing frame 3. 4th-lens-group guide studs 45 are, as shown in FIGS. 1 and 2, implanted in the 4th-lens-group holding frame 4. The first cam barrel 16 is, as shown in FIG. 4, formed with 3rd-lens-group and 4th-lens-group guide cams 44 and 46 in which the 3rd-lens-group and 4th-lens-group guide studs 43 and 45 are respectively fitted. The first cam barrel 16 has its end closer to an object formed with the recesses 100 extending along the optical axis.

Figure 5:
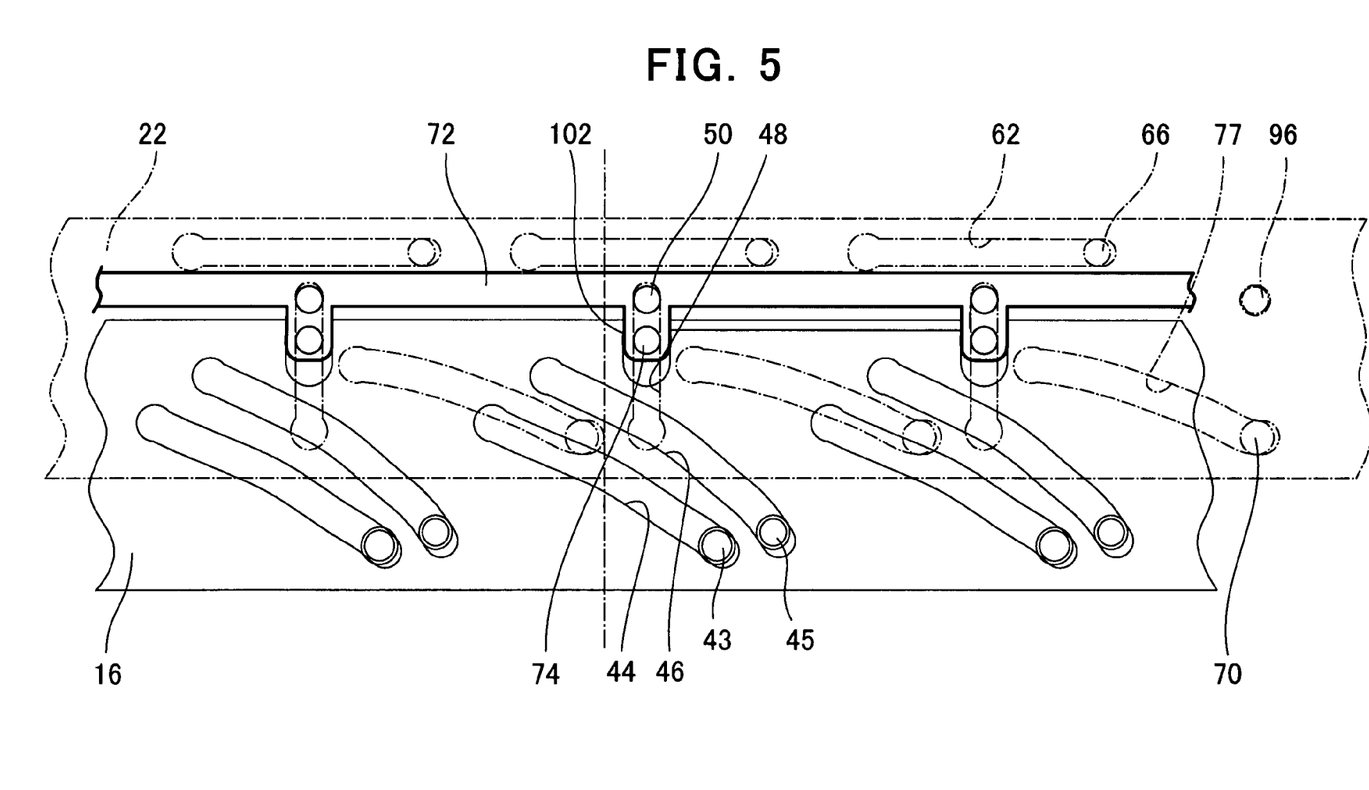
FIG. 5 is an exploded view illustrating a 2nd-lens-group sliding frame of the exemplary compact zoom.

Additional studs 50 are, as shown in FIG. 5, implanted in and extended outwardly from the 2nd-lens-group sliding frame 72 so as to cooperatively work with the second cam barrel, and additionally 2nd-lens-group studs 74 are implanted in and extended inwardly from the same. The 2nd-lens-group sliding frame 72 has its end closer to an imaging plane provided with protrusions 102 which extend along the optical axis and are slidably fitted in the recesses 100.

Figure 6:
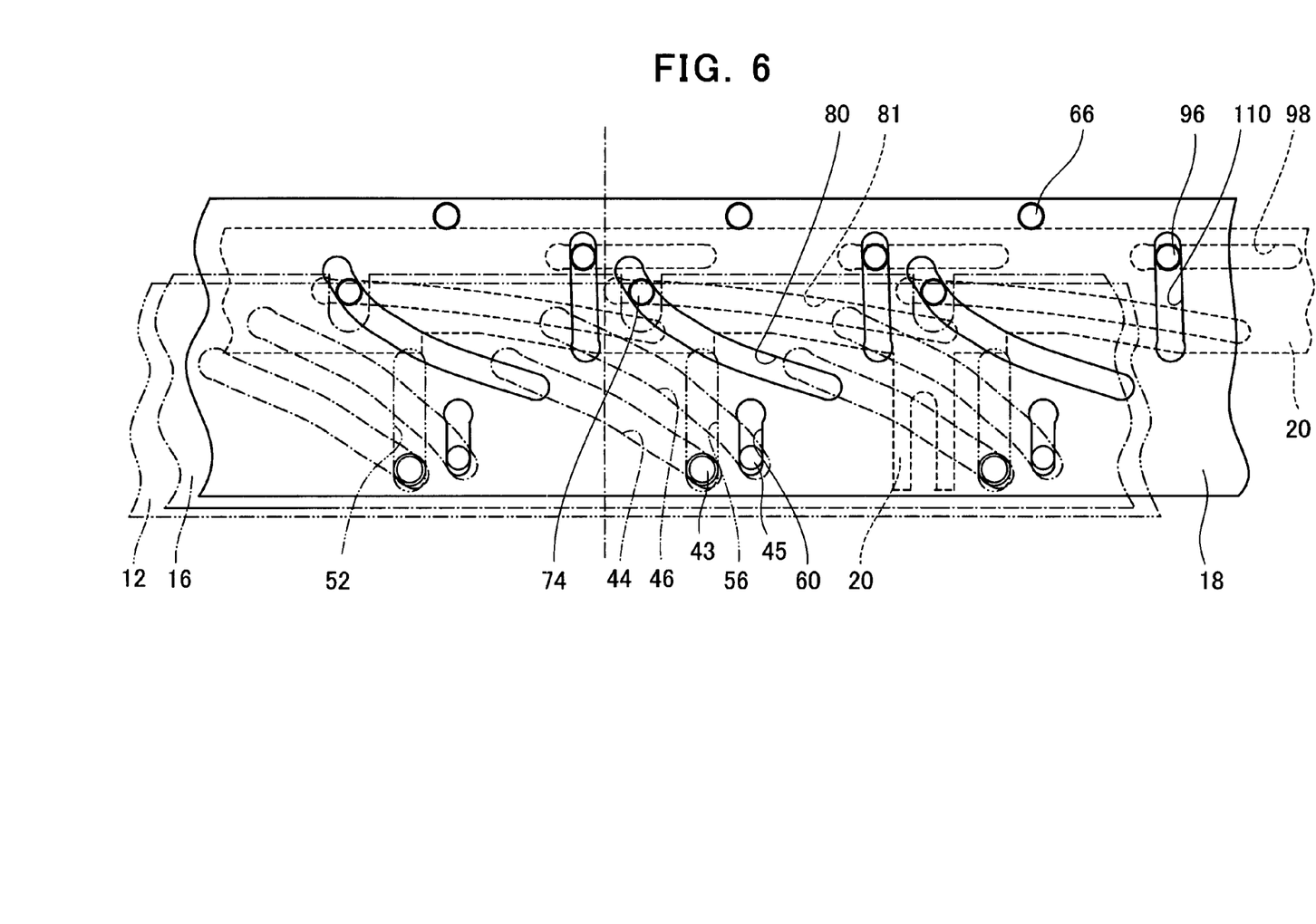
FIG. 6 is an exploded view illustrating a linearly movable barrel of the exemplary compact zoom.

The linearly movable barrel 18 is, as shown in FIG. 6, formed with apertures 56 and second longitudinal guide grooves 60; and the 3rd-lens-group guide studs 43 implanted in and protruding outward from the 3rd-lens-group holding frame 3 are fitted in the apertures 56 while the 4th-lens-group guide studs 45 are fitted in the grooves 60. The linearly movable barrel 18 is further provided with 2nd-lens-group guide cams 80 which the 2nd-lens-group studs 74 implanted in and protruding inwardly from the 2nd-lens-group sliding frame 72 extend through.

The linearly movable barrel 18 has its end closer to an object provided with guide studs 66 which are implanted therein and protruding outward therefrom so as to guide the 1-st-lens-group sliding frame. The guide studs 66 extend through lateral guide grooves 62 in the second cam barrel 22 and are fitted in sixth longitudinal guide grooves 65 in the first-lens-group sliding barrel 24. As mentioned later in the context of a structure of focusing mechanism, the linearly movable barrel 18 is further provided with linearly movable barrel correcting cams 110 in which 2nd-lens-group focusing studs 96 are fitted.

Figure 7:
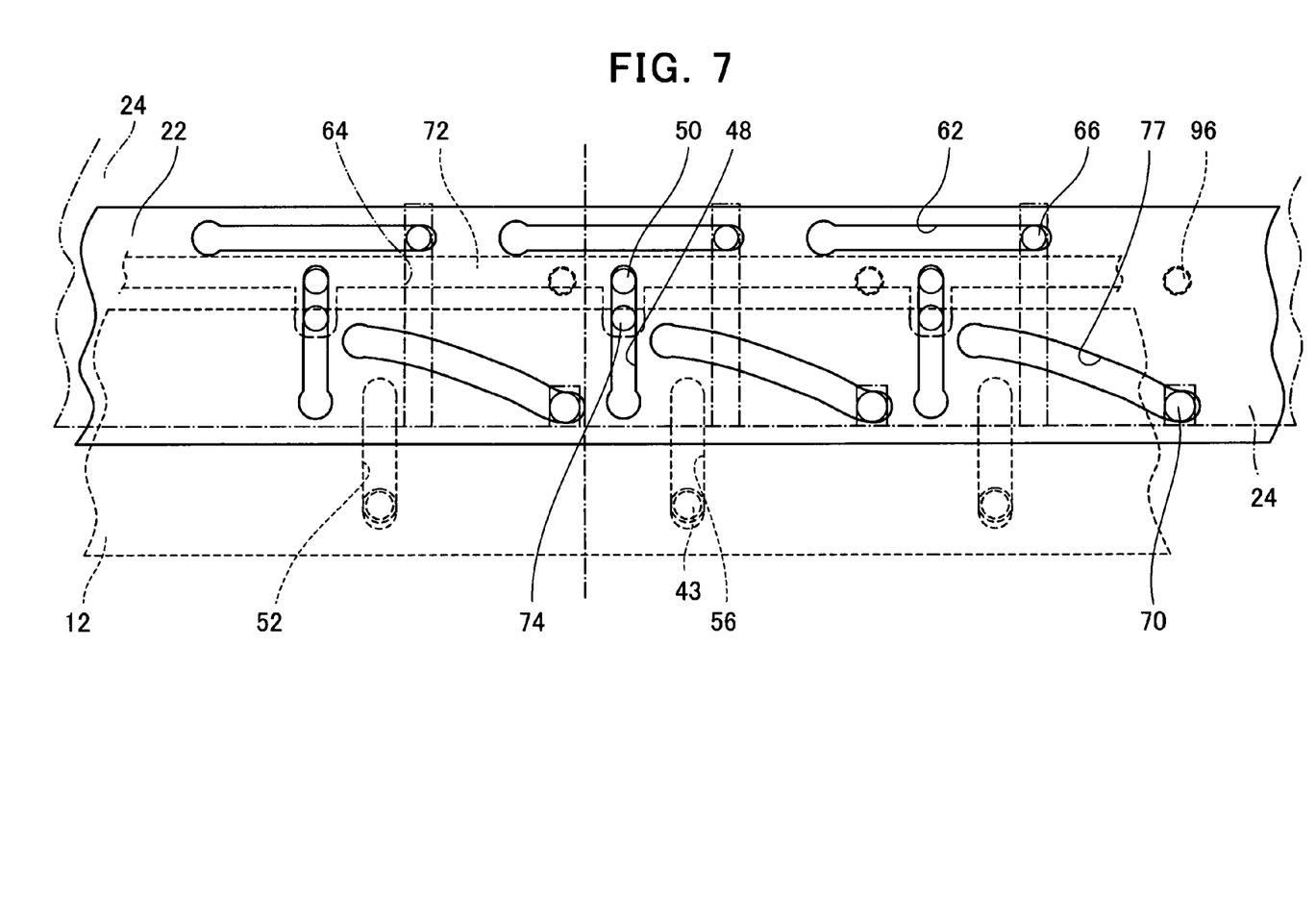
FIG. 7 is an exploded view illustrating a second cam barrel of the exemplary compact zoom.

The second cam barrel 22 is, as shown in FIG. 7, provided with 1st-lens-group guide cams 77 in which studs 70 in the 1st-lens-group sliding frame 24 are fitted to slidably move the first group of lenses, and it is also formed with fifth longitudinal guide grooves 48 in which the studs 50 implanted in the 2nd-lens-group sliding frame 72 are fitted so as to coopera-tively work with the second cam barrel. The second cam barrel 22 is also provided with lateral guide grooves 62 through which the studs 66 extend so as to guide the first-lens-group sliding frame.

Figure 8:
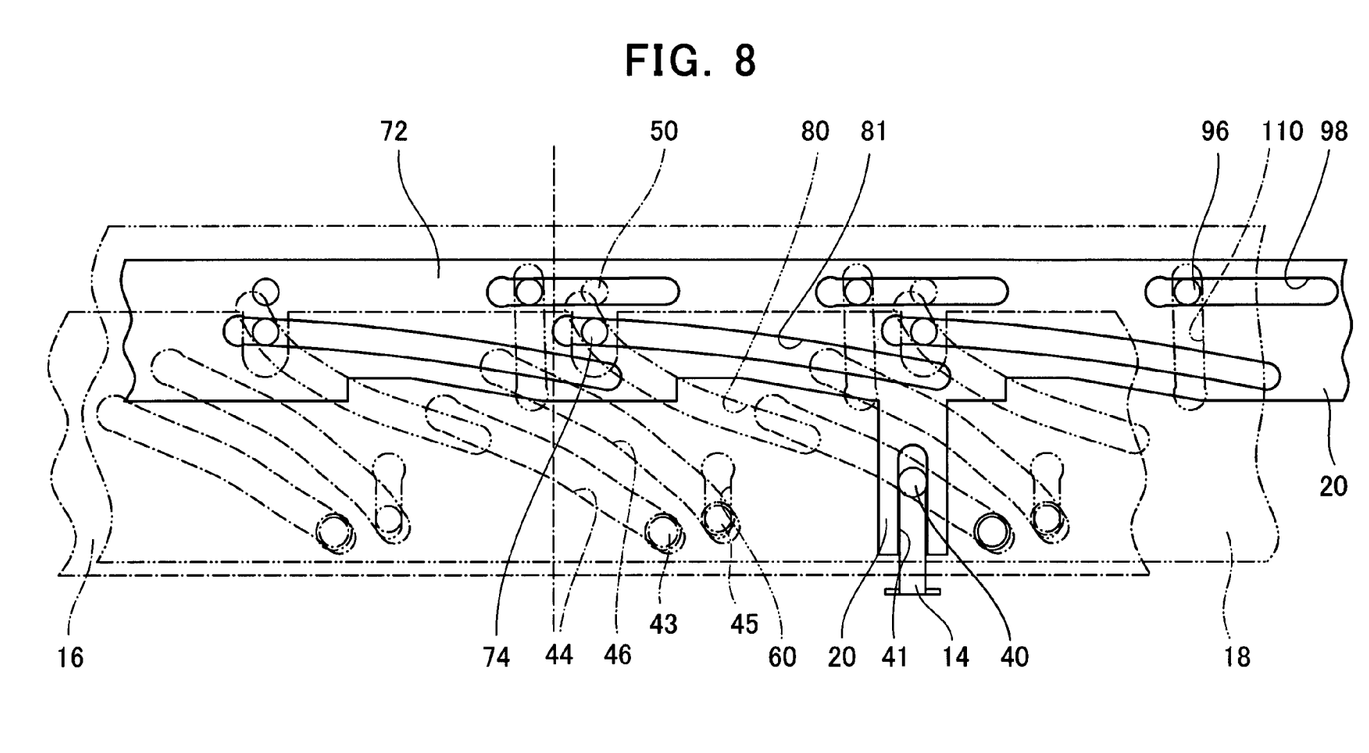
FIG. 8 is an exploded view illustrating a focusing cam barrel of the exemplary compact zoom lens.

The focusing cam barrel 20 is, as shown in FIG. 8, formed with longitudinal grooves 41, focusing cams 81, focusing barrel correcting cams 98; and the focusing connector studs 40 are fitted in the longitudinal grooves 41, the 2nd-lens-group studs 74 are fitted in the focusing cams 81, and the 2nd-lens-group focusing studs 96 are fitted in the correcting cams 98. The 2nd-lens-group studs 74 are implanted in the 2nd-lens-group sliding frame 72. The 2nd-lens-group focusing studs 96 are implanted in the 2nd-lens-group holding frame 2. The 2nd-lens-group studs 74 are fitted in the 2nd-lens-group guide cams 80 in the linearly movable barrel 18.

<Function of the Zooming Mechanism>

Figure 9:
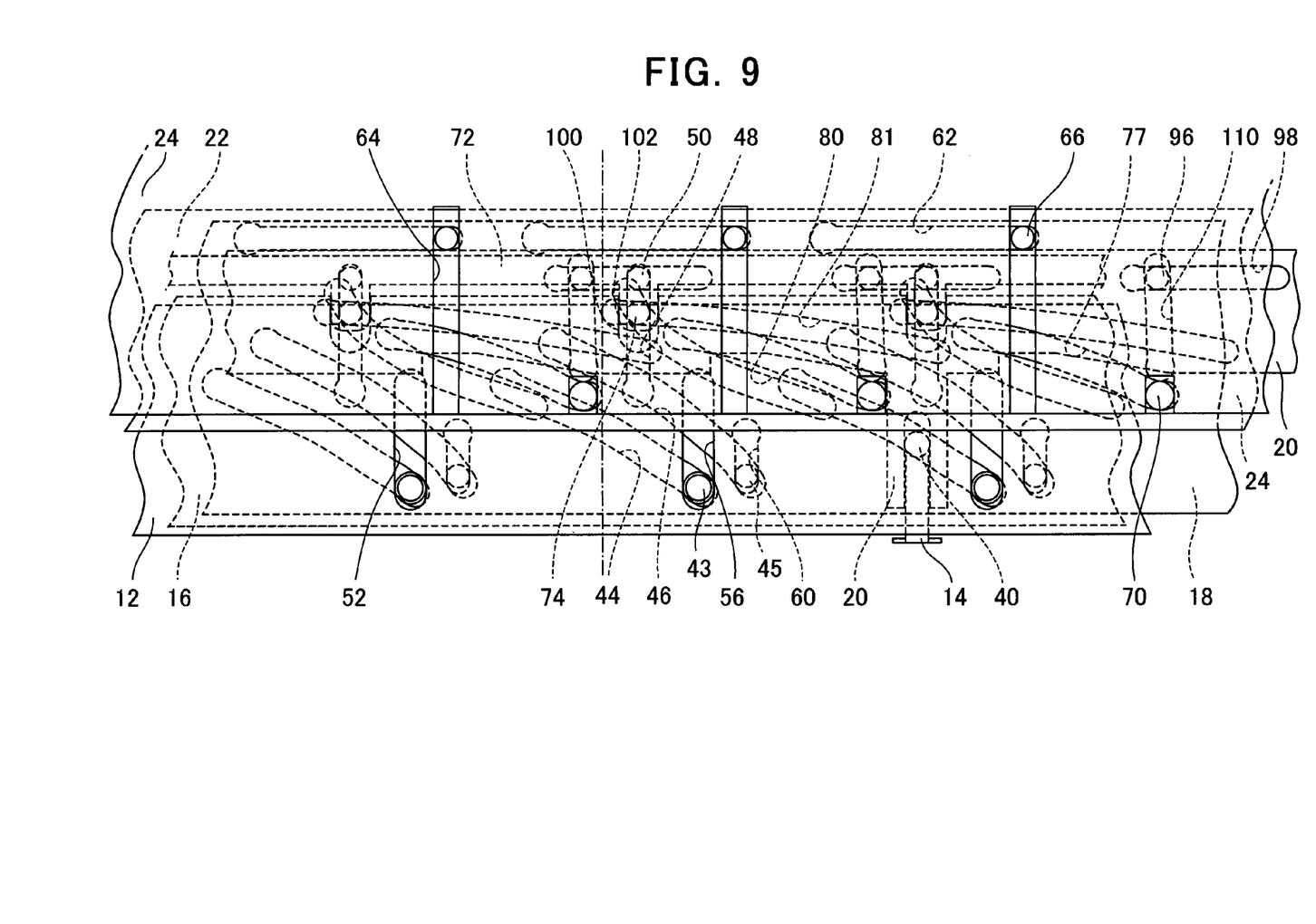
FIG. 9 is an exploded view illustrating the exemplary compact zoom lens in a zoom-wide posture.
Figure 10:
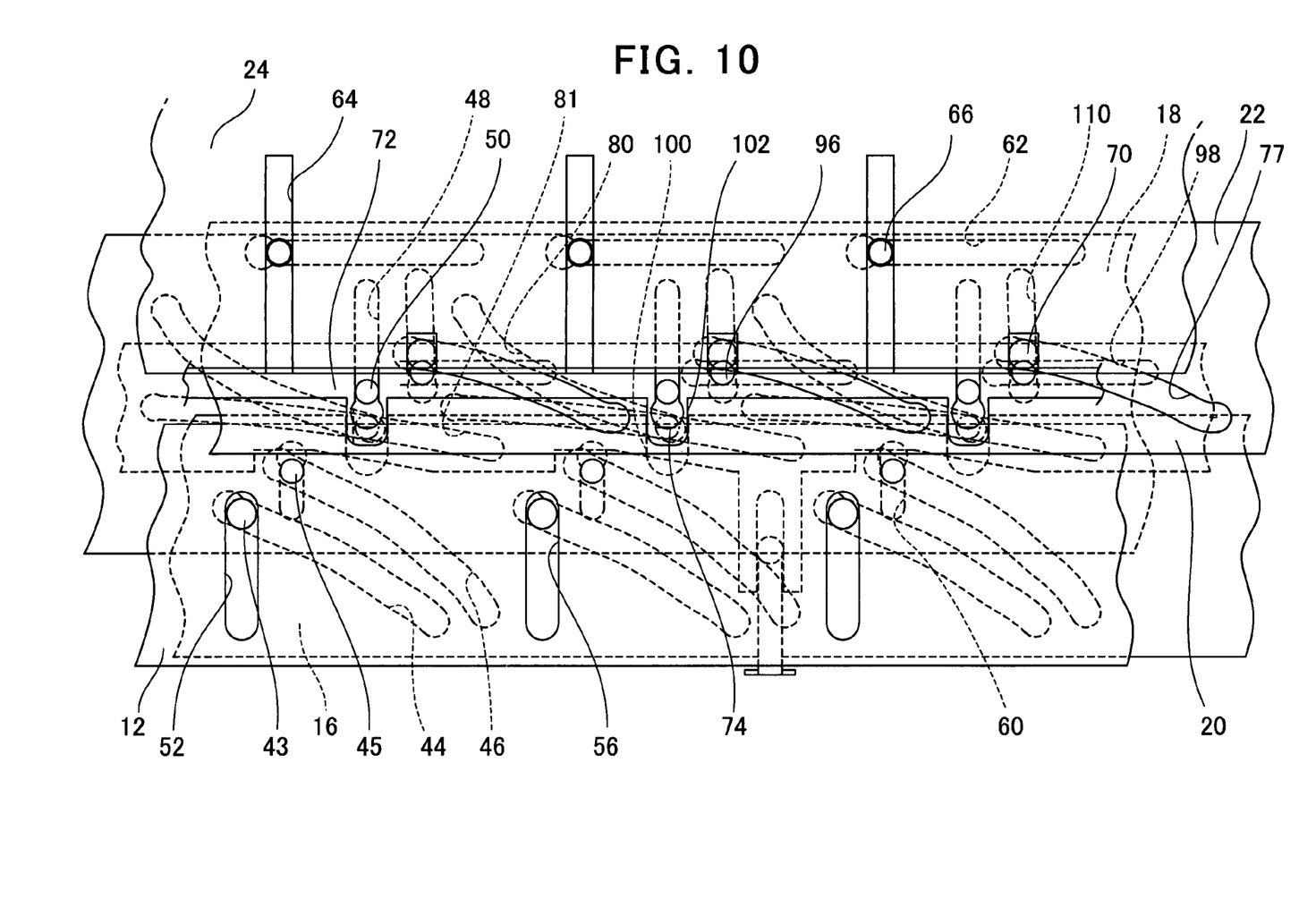
FIG. 10 is an exploded view illustrating the exemplary compact zoom lens in a zoom-tele posture.

The zooming mechanism, as shown in FIGS. 9 and 10, has a function that the rotating zoom ring 30 makes the first cam barrel 16 follow the rotation. As the first cam barrel 16 revolves, the 3rd-lens-group guide studs 43, which are fitted in the third longitudinal guide grooves 52 defined in both the fixed barrel 12 and the first cam barrel 16 and also fitted in the 3rd-lens-group guide cams 44 provided in the first cam barrel 16, force the linearly movable barrel 18 and the third group C of lenses to slide along the optical axis.

The rotation of the first cam barrel 16 is transmitted to the 2nd-lens-group sliding frame 72 by means of a slidable engagement of the recesses 100 in the first cam barrel 16 with the protrusions 102 in the 2nd-lens-group sliding frame 72.

The rotation followed by the 2nd-lens-group sliding frame 72 is transmitted to the second cam barrel 22 by means of an engagement of the fifth longitudinal guide grooves 48 in the second cam barrel 22 with the studs 50 implanted in the 2nd-lens-group sliding frame 72 and cooperative with the second cam barrel. The rotation followed by the 2nd-lens-group sliding frame 72 further forces the 2nd-lens-group studs 74 implanted in the 2nd-lens-group sliding frame 72 to engage with the 2nd-lens-group guide cams 80 in the linearly movable barrel 18, and this causes the linearly movable barrel 18 to slide along the optical axis.

The studs 66 to guide the 1st-lens-group sliding frame protrude through the lateral guide grooves 62 to be fitted in the sixth longitudinal guide grooves 65 in the 1st-lens-group sliding frame 24, and in addition, the first-lens-group sliding studs 70 implanted in the 1st-lens-group sliding barrel 24 are fitted in the sixth longitudinal guide grooves 65 in the second cam barrel 26. These engagements allow the rotation of the first cam barrel 16 to be followed by the second cam barrel 22, and eventually, the 1st-lens-group sliding frame 24 carrying the first group A of lenses is moved along the optical axis.

Then, since the 1st-lens-group sliding frame 24 is supported by the second cam barrel 22, a simultaneous movement of the second cam barrel 22 along with the linearly movable barrel 18 permits the 1st-lens-group sliding frame 24 to move along with the first group A of lenses held by the same, for the zooming.

The 2nd-lens-group studs 74 attached to the 2nd-lens-group sliding frame 72 are engaged with the focusing cams 81 in the focusing cam barrel 20 and the 2nd-lens-group guide cams 80 in the linearly movable barrel 18. Thus, the rotation of the first cam barrel 16 forces the 2nd-lens-group studs 74 to slide along the optical axis and concomitantly revolve about the same, and this further causes the focusing cam barrel 20 to move along the optical axis. The movement of the focusing cam barrel 20 without a concurrent rotation enables the focusing cam barrel 20 along with the second group B of lenses to move in unit along the optical axis for the zooming.

The third group C of lenses carried by the 3rd-lens-group holding frame 3 slide along the optical axis together with the linearly movable barrel 18 for the zooming by virtue of an engagement of the 3rd-lens-group guide studs 43 with the third longitudinal guide grooves 52 in the fixed barrel 12 and the 3rd-lens-group guide cams 44 in the first cam barrel 16.

The fourth group D of lenses carried by the 4th-lens-group holding frame 4 slide along the optical axis for the zooming by virtue of an engagement of the 4th-lens-group guide studs 45 with the 4th-lens-group guide cams 46 in the first cam barrel 16 and the second longitudinal guide grooves 60 in the linearly movable barrel 18.

<Functions of the Focusing Mechanism>

The focusing mechanism has a function that the rotating focusing-ring 28 makes the focusing cam barrel 20 follow the rotation via the focusing connector studs 40. As the focusing cam barrel 20 is rotated, the second group B of lenses revolve and concurrently slide along the optical axis for the focusing, because of an engagement of the stationary 2nd-lens-group studs 74 with the focusing cams 81 and the engagement of the 2nd-lens-group focusing studs 96 with the focusing cam barrel correcting cams 98 and the linearly movable barrel correcting cams 100.

<Variation of the Embodiment>

The engagement of the first cam barrel 16 with the 2nd-lens-group sliding frame 72, namely, the engagement of the recesses 100 with the protrusions 102 both of which linearly extend along the optical axis, can be replaced with some other rotation transmitting structure where all the studs are not necessarily fitted in their respective mate cams.

We claim:

1. A compact zoom lens that has a multi-layer telescopic structure with four groups of lenses, or first to fourth lens groups, comprising
   a fixed barrel,
   a second-lens-group sliding frame, a first cam barrel, and a linearly movable barrel underlaying the fixed barrel one over another in this order,
   a second cam barrel overlaying the fixed barrel,
   the fixed barrel being formed with longitudinal guide grooves in which third-lens-group guide studs are fitted, the guide studs being implanted in and extending outward from a third-lens-group holding frame;
   the first cam barrel being provided with third-lens-group and fourth-lens-group guide cams, the third-lens-group guide studs being engaged with the third-lens-group guide cams while fourth-lens-group guide studs are engaged with the fourth-lens-group guide cams, and the first cam barrel having its end closer to an object formed with recesses that extend along the optical axis;
   the second-lens-group sliding frame having studs implanted therein and extending outward therefrom to cooperatively work with the second cam barrel, and also having second-lens-group studs implanted therein and extending inward therefrom;
   the linearly movable barrel being provided with apertures, longitudinal guide grooves, and second-lens-group guide cams, the third-lens-group guide studs being fitted in the apertures, the fourth-lens-group guide studs being fitted in the longitudinal guide grooves, the second-lens-group studs being engaged with the guide cams, and studs protruding outward being located ahead of the fixed barrel so as to guide a first-lens-group sliding frame; and
   the second cam barrel having its outer surface provided with first-lens-group guide cams and its inner surface formed with longitudinal guide grooves, first-lens-group sliding studs implanted in the first-lens-group sliding frame being engaged with the first-lens-group guide cams while the studs implanted in the second-lens-group sliding frame to cooperatively work with the second cam barrel are fitted in the longitudinal guide grooves.

2. A compact zoom lens that has a multi-layer telescopic structure, comprising A compact zoom lens that has a multi-layer telescopic structure, comprising
   a first layer including a fixed barrel;
   a second layer including a grouped-lens sliding frame and a first cam barrel (16), the second layer underlaying the first layer;
   a third layer underlaying the second layer, the third layer including a linearly movable barrel; and
   a fourth layer overlaying the first layer, the fourth layer including a second cam barrel;
   wherein the grouped-lens sliding frame and the first cam barrel are fixed in rotational direction and engaged with each other so as to enable a relative rotation with each other along the optical axis; and
   wherein the grouped-lens sliding frame transmits the rotation of the first cam barrel to the second cam barrel.

* * * * *